(12) United States Patent
Wan et al.

(10) Patent No.: US 7,762,696 B2
(45) Date of Patent: Jul. 27, 2010

(54) VEHICLE LAMP

(75) Inventors: Cheng-Feng Wan, Tainan (TW); Hao-Hui Lin, Tainan (TW); Su-Chen Hu, Tainan (TW)

(73) Assignee: Man Zai Industrial Co., Ltd., Tainan (TW)

( * ) Notice: Subject to any disclaimer, the term of this patent is extended or adjusted under 35 U.S.C. 154(b) by 0 days.

(21) Appl. No.: 12/271,985

(22) Filed: Nov. 17, 2008

(65) Prior Publication Data

US 2009/0135620 A1    May 28, 2009

(30) Foreign Application Priority Data

Nov. 28, 2007  (TW) .............................. 96220077 U

(51) Int. Cl.
*F21V 29/00* (2006.01)
(52) U.S. Cl. ..................... 362/373; 362/294; 362/547
(58) Field of Classification Search ................ 362/218, 362/241, 249.02, 294, 370, 373, 432, 545, 362/547, 800
See application file for complete search history.

(56) References Cited

U.S. PATENT DOCUMENTS

| | | | | |
|---|---|---|---|---|
| 3,112,890 A * | 12/1963 | Snelling | ...................... | 362/373 |
| 6,450,670 B1 * | 9/2002 | Strauss et al. | ............... | 362/294 |
| 7,114,837 B2 * | 10/2006 | Yagi et al. | .................... | 362/547 |
| 7,461,952 B2 * | 12/2008 | Trenchardl et al. | .......... | 362/373 |
| 2008/0062694 A1 * | 3/2008 | Lai et al. | ..................... | 362/294 |

\* cited by examiner

*Primary Examiner*—Y My Quach Lee
(74) *Attorney, Agent, or Firm*—Alan Kamrath; Kamrath & Associates PA

(57) ABSTRACT

A vehicle lamp has a lamp holder, an LED array, an interior heat sink and a heat exchanger. The lamp holder is hollow and has a heat conductive portion. The LED array is mounted in the lamp holder. The interior heat sink is mounted on the LED array and has an inner conductor attached between the LED array and the heat conductive portion. The heat exchanger is mounted on an outer side of the heat conductive portion. Therefore, the vehicle lamp can efficiently dissipate heat generated by the LED array by the interior heat sink and the heat exchanger with little or no dust entering the lamp holder and accumulating on the LED array for improved lifespan and constant heat dissipating performance.

9 Claims, 5 Drawing Sheets

VEHICLE LAMP

BACKGROUND OF THE INVENTION

1. Field of the Invention

The present invention relates to a vehicle lamp and, more particularly, to a vehicle lamp with a heat sink.

2. Description of the Prior Arts

Light-emitting diodes (LED) are often used as illuminants in vehicles because of their energy saving property, high efficiency of illumination and small volume. A portion of power inputted into an LED is transformed into heat. To achieve improved brightness, multiple LEDs may be disposed in an array, and technologies focus on attaining a high number to area ratio. However, increased numbers of LEDs per surface area concentrate heat produced and, therefore, requires a cooling system. Conventionally, an LED array is disposed on a heat sink.

With reference to FIG. 5, a conventional lamp comprises a bracket (90), a lens (92), an LED array (93) and a heat sink (96). The bracket (90) has a front, a rear, a chamber and at least one throughhole (91). The chamber is formed between the front and the rear of the bracket (90). The at least one throughhole (91) is formed through the rear of the bracket (90) and communicates with the chamber. The lens (92) is mounted over the chamber, at the front of the bracket (90). The LED array (93) is mounted inside the chamber of the bracket (90) and has a circuit board (94) and multiple LEDs (95). The circuit board (94) is selectively electrically connected to a power source and has a front side and a rear side. The LEDs (95) are mounted on the front side of the circuit board (94). The heat sink (96) is mounted on the rear side of the circuit board (94) and has multiple cooling fins (98). The cooling fins (98) respectively extend through the at least one throughhole (91) of the bracket (90). Thus, by increasing a surface area of the circuit board (94), the cooling fins (98) can facilitate heat dissipating efficiency of the vehicle lamp.

However, dust from the environment can easily pass through the at least one throughhole (91) to enter the chamber and may also accumulate on the LED array (93) and affect illumination of the LEDs (95). Further, the dust may cover the cooling fins (98) and insulate the cooling fins (98) thereby preventing radiation of heat and possibly causing overheating causing damage or even terminal failure to the LED array (93).

To overcome the shortcomings, the present invention provides a vehicle lamp to mitigate or obviate the aforementioned problems.

SUMMARY OF THE INVENTION

The main objective of the invention is to provide a vehicle lamp with efficient heat dissipation.

A vehicle lamp comprises a lamp holder, an LED array, an interior heat sink and a heat exchanger. The lamp holder is hollow and has a heat conductive portion. The LED array is mounted in the lamp holder. The interior heat sink is mounted on the LED array and has an inner conductor. The inner conductor is attached between the LED array and the heat conductive portion. The heat exchanger is mounted on an outer side of the heat conductive portion. Therefore, the vehicle lamp can efficiently dissipate heat generated by the LED array by the interior heat sink through the inner conductor and heat exchanger with little or no dust entering the lamp holder and accumulating on the LED array for improved lifespan and constant heat dissipating performance.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
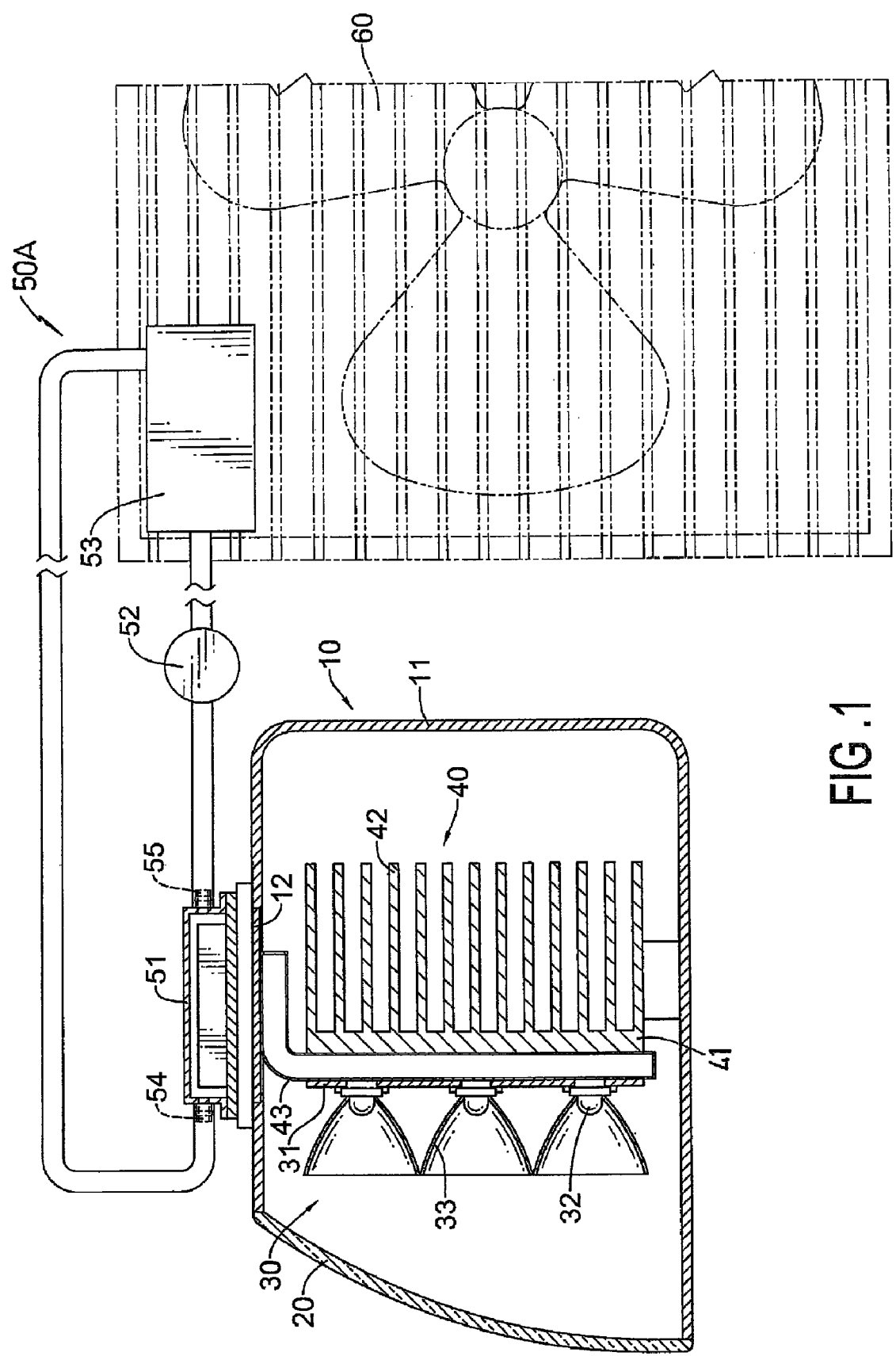
FIG. 1 is a side view in partial section of a first embodiment of a vehicle lamp in accordance with the present invention implemented with an external fan.

With reference to the FIG. 1, a vehicle lamp in accordance with the present invention comprises a lamp holder (10), an LED array (30), an interior heat sink (40) and a heat exchanger.

The lamp holder (10) is hollow and has an optional bracket (11), a heat conductive portion (12), and an optional lens (20). The bracket (11) has a front, a rear, an opening and an interior surface. The interior surface of the bracket (11) defines a chamber. The opening is formed in the front of the bracket (11) and communicates with the chamber. The heat conductive portion (12) is mounted through the bracket (11) of the lamp holder (10), is heat conductive, may be formed of sheet metal with good heat conductivity such as copper and has an inner side and outer side. The heat conductive portion (12) may comprise two plates securely clamped hermetically on the bracket (11) and having electrical wires mounted therethrough to power the LED array (30).

The lens (20) is mounted over the front of the bracket (11), allows light to pass through and may optionally focus the light.

The LED array (30) is mounted in the lamp holder (10), may be in the chamber inside the bracket (11) of the lamp holder (10) and has a circuit board (31), at least one LED (32) and an optional at least one reflector (33). The circuit board (31) is selectively connected electrically to a power source and has a front side and a rear side. The front side of the circuit board (31) faces the front of the bracket (11) and the lens (20). The at least one LED (32) is mounted on and electrically connected to the front side of the circuit board (31). The at least one reflector (33) is reflective and is mounted respectively around the at least one LED (32) and may cover the front of the circuit board to focus or disperse light from the LED (33). The reflector (33) may optionally protrude toward the lens (20).

Figure 3:
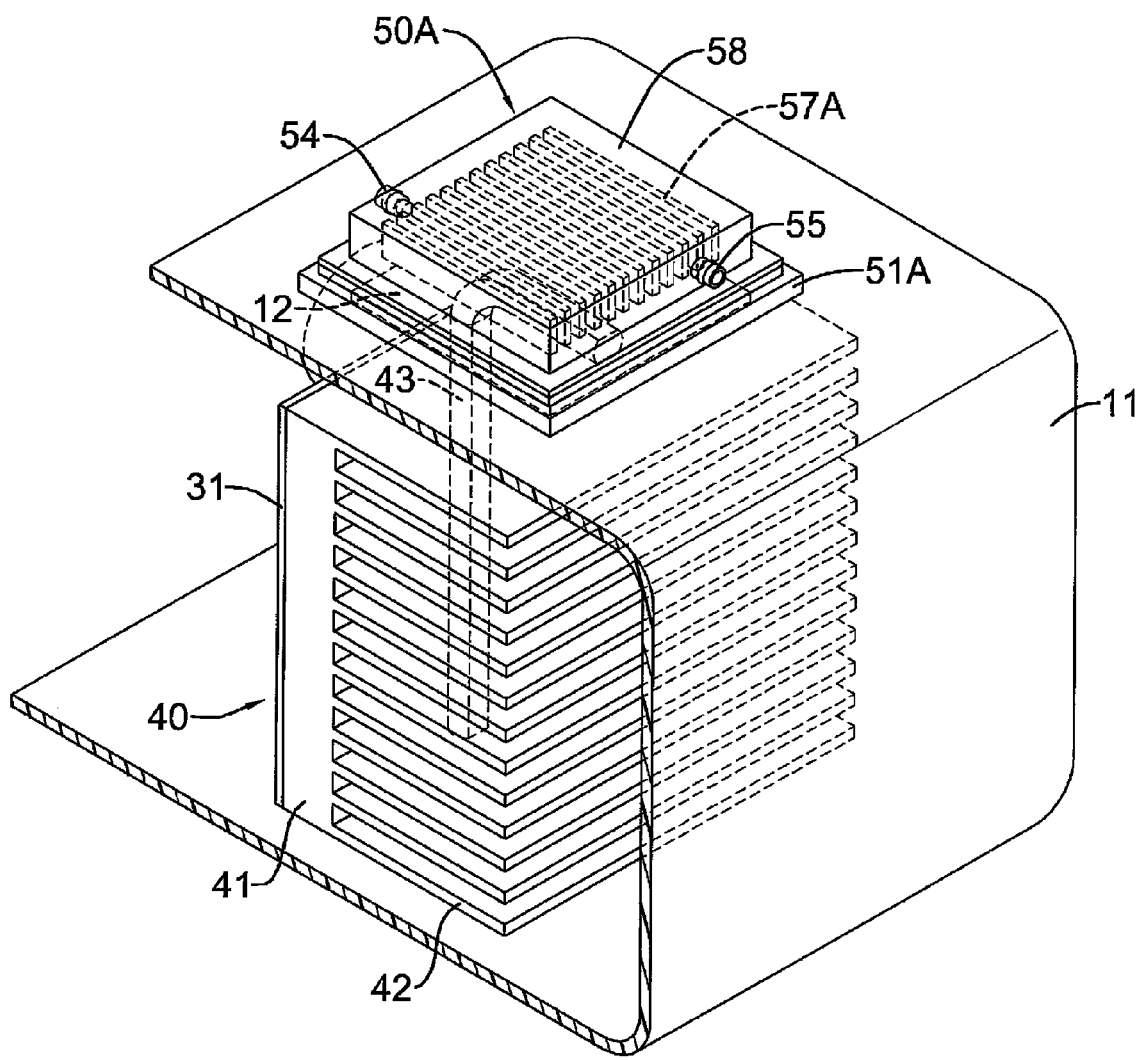
FIG. 3 is a partial perspective view of a second embodiment of a lamp holder for the vehicle lamp in accordance with the present invention with a conductor shown in phantom lines.

With further reference to FIG. 3, the interior heat sink (40) is mounted on the rear side of the circuit board (31) of the LED array (30) and has a cooling base (41) and an inner conductor (43). The cooling base (41) is mounted on the rear side of the circuit board (31) of the LED array (30) and has multiple optional cooling fins (42). The cooling fins (42) extend out from the cooling base (41) toward the rear of the bracket (10). The inner conductor (43) is attached to the cooling base (41) and has a gathering end and a transferring end. The gathering end of the inner conductor (43) may be formed with the cooling base (41), may be mounted through the cooling base (41) or may be mounted on the cooling base (41) and allows heat in the cooling base (41) to be transferred to the inner conductor (43). The transferring end of the inner conductor (43) abuts and extends along the inner side of the heat conductive portion (12) of the lamp holder (10) to conduct heat generated by the LED array (30) to the heat conductive portion (12). The inner conductor (43) may be a heat conductive metal such as copper and may be a sheet, multiple pipes or the like.

Figure 2:
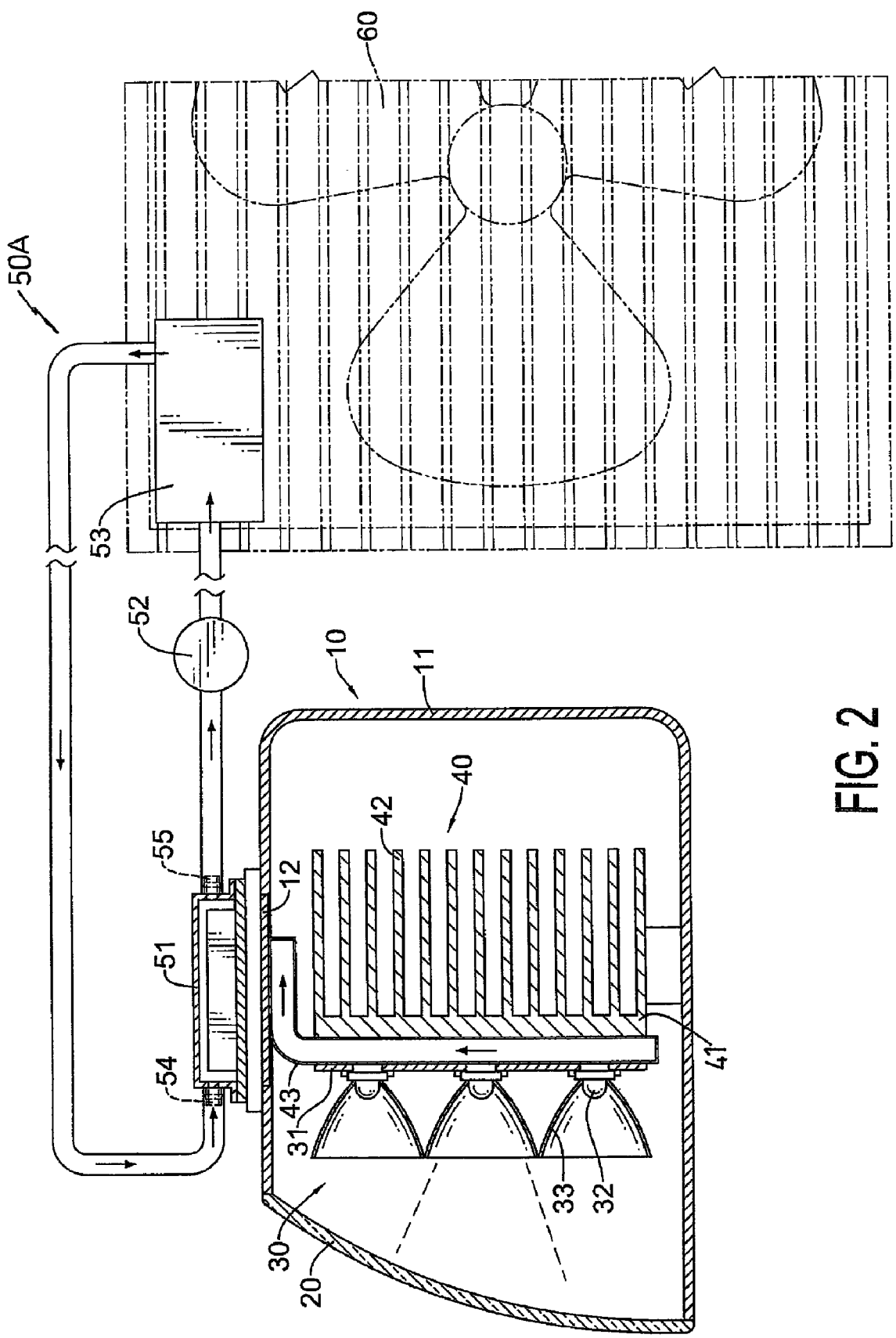
FIG. 2 illustrates the transmission of heat generated by LEDs in the vehicle lamp in FIG. 1.
Figure 4:
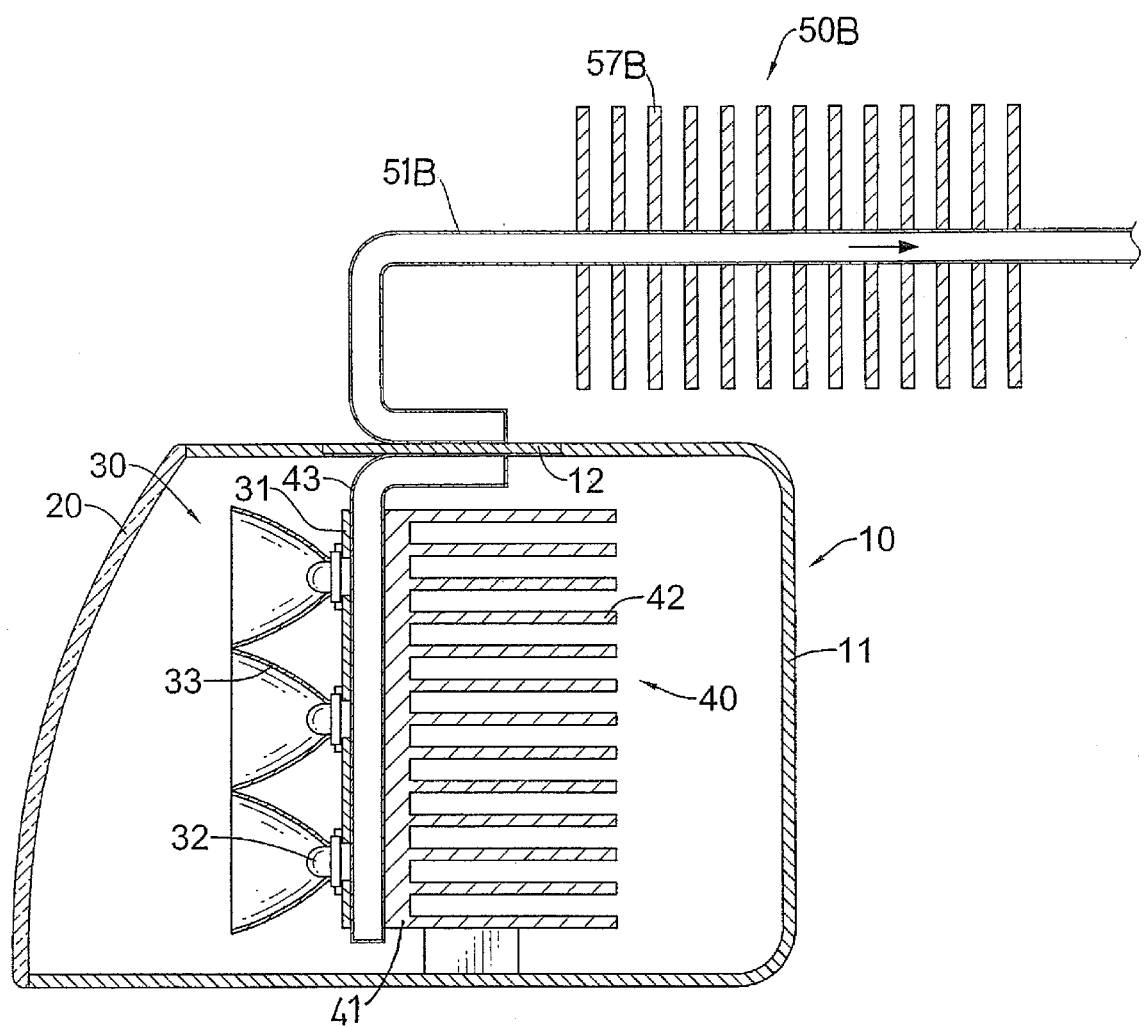
FIG. 4 is a side view in partial section of a third embodiment of a vehicle lamp in accordance with the present invention.
Figure 5:
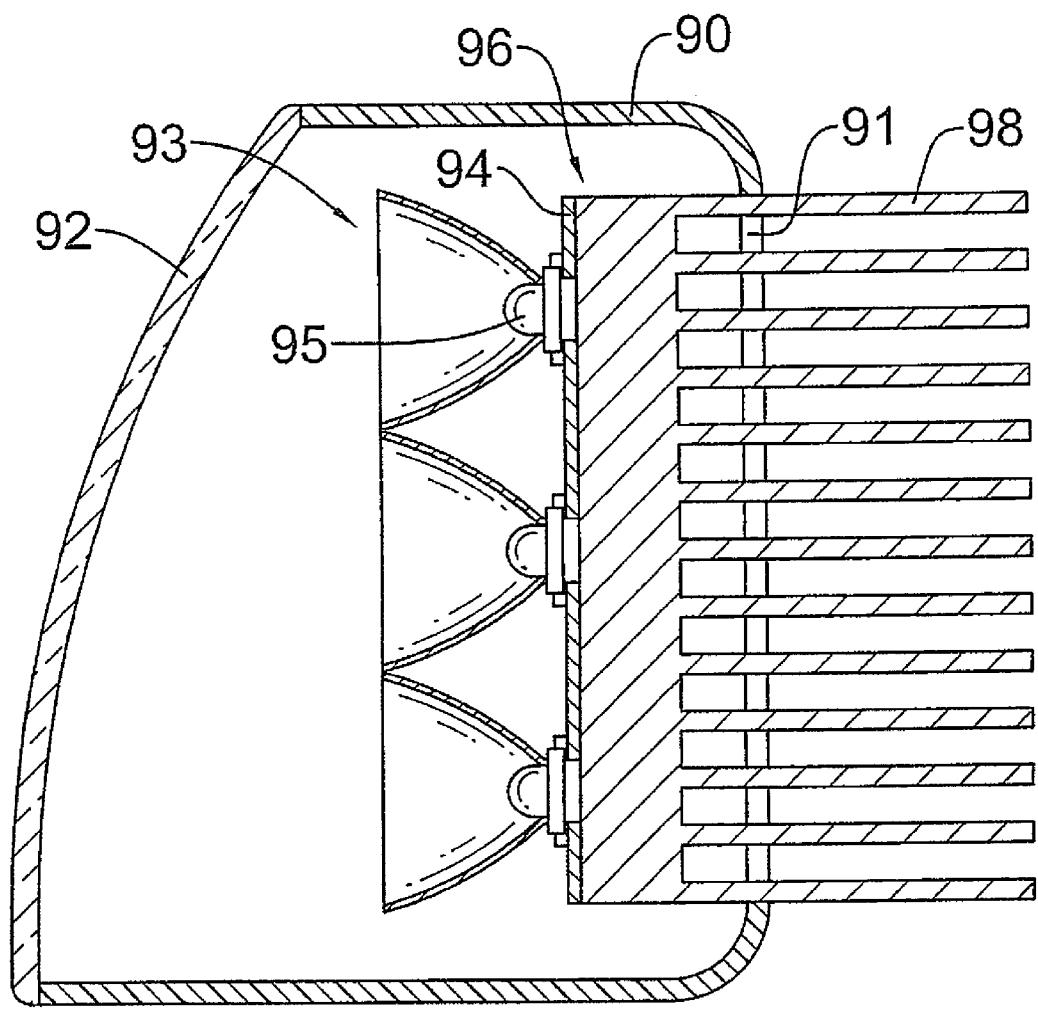
FIG. 5 is a side view in partial section of a conventional vehicle lamp in accordance with the prior art.

With further reference to FIGS. 2 and 4, the heat exchanger (50A, 50B) may be a liquid cooled heat exchanger or an air cooled heat exchanger, is mounted on the outer side of the heat conductive portion (12) of the lamp holder (10) and removes heat from the inner conductor (43) through the heat conductive portion (12) of the bracket (11). The heat exchanger (50A, 50B) comprises a base (51A, 51B) and multiple optional fins (57A, 57B) and may have a cover (58), a pump (52) and a cooler (53). The base (51A, 51B) is mounted securely on the heat conductive portion (12) of the bracket (11) and is conductive. The fins (57A, 57B) are attached securely to and protrude from the base (51A, 51B).

When the heat exchanger (50A) is implemented as a liquid cooled heat exchanger, the base (51A) is mounted securely on the heat conductive portion (12) of the bracket (11), has an outer edge and may be quadrangular. The cover (58) is hollow, is mounted hermetically around the outer edge of the base (51A) and has an inlet (54), an outlet (55) and an inner chamber. The inlet (54) and outlet (55) of the cover (58) are respectively formed through the cover (58) and may be disposed at opposite corners of the base (51A). The inner chamber is defined between the cover (58) and the base (51A) and communicates with the inlet (54) and the outlet (55). The pump (52) is hermetically connected to the outlet (55) of the base (51) by a tube and may be a compressor. The cooler (53) is hermetically connected to the pump (52) and the inlet (54) of the cover (58) by tubes to allow a liquid to circulate inside and may comprise an expansion valve. The cooler (53) may be mounted adjacent to a blower to enhance efficiency of heat dissipation of the cooler (53). The expansion valve is mounted between the inlet (54) of the cover (58) and the cooler (53). The liquid may be a refrigerant such as butane, ammonia or the like. The blower may be part of a radiator, air conditioner, specific fan for the lamp or multiple lamps or may be a fin aerodynamically directing air over the cooler (53) when in motion.

When the heat exchanger is implemented as the air cooled heat exchanger (50B), the base (51B) may be an outer conductor and has a proximal end and a distal end. The outer conductor may be implemented as a sheet or tube and has at least one side. The proximal end of the outer conductor is mounted securely on the heat conductive portion (12) of the bracket (11). The fins (57B) may be quadrangular, are attached to and protrude from the at least one side of the outer conductor, may protrude from two sides of the outer conductor or may protrude radially as disks from the outer conductor.

Heat generated by the LED array (30) is conducted by the heat conductive portion (12) from the LED array (30) to the base (51B) of the heat exchanger (50B). The heat is further dissipated by the fins (57A, 57B) or by the liquid circulating in the liquid cooled heat exchanger (50B).

Based on the structure as described above, the vehicle lamp in accordance with the present invention allows little or no dust to enter the chamber inside the lamp holder (10) and accumulate on the LED array (30). Accordingly, dust will not negatively affect performance and life time of the LED array (30) or cooling of the fins (57A, 57B) of the lamp in accordance with the present invention.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the fall extent indicated by the broad general meaning of the terms in which the appended claims are expressed.

What is claimed is:

1. A vehicle lamp comprising
a lamp holder being hollow and comprising a bracket, the bracket having
a heat conductive portion having
an inner side; and
an outer side;
an LED array mounted in the lamp holder and having
a circuit board having
a front side; and
a rear side;
at least one LED mounted on and electrically connected to the front side of the circuit board;
an interior heat sink mounted on the rear side of the circuit board of the LED array and having
a cooling base mounted on the rear side of the circuit board; and
an inner conductor attached to the cooling base and having
a gathering end; and
a transferring end abutting the inner side of the heat conductive portion; and
a heat exchanger mounted on the outer side of the heat conductive portion and having
a base mounted securely on the heat conductive portion of the bracket and being heat conductive.

2. The vehicle lamp as claimed in claim 1, wherein the heat exchanger further has multiple fins attached securely to and protruding from the base.

3. The vehicle lamp as claimed in claim 1, wherein
the base of the heat exchanger has an outer edge; and
the heat exchanger further has
a cover being hollow, being mounted hermetically around the outer edge of the base and having
an inlet and an outlet respectively formed through the cover; and
an inner chamber defined between the cover and the base and communicating with the inlet and the outlet;
a pump hermetically connected to the outlet of the base; and
a cooler hermetically connected to the pump and the inlet of the cover.

4. The vehicle lamp as claimed in claim 2, wherein
the base of the heat exchanger has an outer edge; and
the heat exchanger further has
a cover being hollow, being mounted hermetically around the outer edge of the base and having
an inlet and an outlet respectively formed through the cover; and
an inner chamber defined between the cover and the base and communicating with the inlet and the outlet;
a pump hermetically connected to the outlet of the base; and a cooler hermetically connected to the pump and the inlet of the cover.

5. The vehicle lamp as claimed in claim 1, wherein the base of the heat exchanger is an outer conductor and has
- a proximal end mounted securely on the heat conductive portion of the bracket;
- a distal end; and
- multiple fins attached to and protruding from the outer conductor.

6. The vehicle lamp as claimed in claim 5, wherein the interior heat sink further has multiple cooling fins extending from the cooling base.

7. The vehicle lamp as claimed in claim 3, wherein the LED array further has at least one reflector, each one of the at least one reflector being mounted around one LED.

8. The vehicle lamp as claimed in claim 4, wherein the LED array further has at least one reflector, each one of the at least one reflector being mounted around one LED.

9. The vehicle lamp as claimed in claim 1, wherein
- the bracket having
  - a front;
  - a rear; and
  - an interior surface defining a chamber;
- a lens mounted to the front of the bracket;
- the heat conductive portion of the lamp holder is mounted through the bracket of the lamp holder;
- the LED array is mounted in the chamber inside the bracket of the lamp holder; and
- the front side of the circuit board of the LED array faces the lens.

* * * * *